US005152403A

United States Patent [19]

Patel

[11] Patent Number: 5,152,403
[45] Date of Patent: Oct. 6, 1992

[54] TREATMENT OF SEAWATER EVAPORATOR AQUEOUS SYSTEMS WITH SCALE-INHIBITING MIXTURE OF POLYMALEIC ANHYDRIDE AND A CARBOXYL-CONTAINING ACRYLIC POLYMER

[76] Inventor: Suresh Patel, 37 Lawnswood Park Road, Swinton, Manchester M27 1NJ, England

[21] Appl. No.: 663,493

[22] Filed: Mar. 1, 1991

[30] Foreign Application Priority Data

Mar. 10, 1990 [GB] United Kingdom ................ 9005440

[51] Int. Cl.$^5$ ............................ C02F 1/00; C02F 5/10
[52] U.S. Cl. ................................. 210/699; 252/180;
252/181; 252/82; 210/701
[58] Field of Search ............... 252/181, 180, 175, 82,
252/86, 394, 388; 210/699, 7000, 701

[56] References Cited

U.S. PATENT DOCUMENTS

| | | | |
|---|---|---|---|
| 3,919,258 | 11/1975 | Richardson et al. | 260/346 |
| 3,963,636 | 6/1976 | Harris et al. | 252/181 |
| 3,965,027 | 6/1976 | Boffardi et al. | 252/180 |
| 4,008,164 | 2/1977 | Watson et al. | 252/180 |
| 4,065,607 | 12/1977 | Kurowsky | 252/180 |
| 4,126,549 | 11/1978 | Jones et al. | 252/180 |
| 4,168,230 | 9/1979 | Farley | 252/180 |
| 4,223,120 | 9/1980 | Kurowsky | 210/701 |
| 4,277,359 | 7/1981 | Lipinski | 252/181 |
| 4,361,492 | 11/1982 | Dubin | 252/175 |
| 4,374,733 | 2/1983 | Snyder et al. | 210/701 |
| 4,435,556 | 3/1984 | Masler | 252/175 |
| 4,446,045 | 5/1984 | Snyder et al. | 252/180 |
| 4,530,766 | 7/1985 | Hann et al. | 210/701 |
| 4,545,920 | 10/1985 | Lorenc et al. | 252/82 |
| 4,631,131 | 12/1986 | Cusia et al. | 210/697 |
| 4,640,793 | 2/1987 | Persinski et al. | 252/82 |
| 4,666,609 | 5/1987 | Tsuneki et al. | 252/180 |
| 4,978,456 | 12/1990 | Sprague | 252/180 |

FOREIGN PATENT DOCUMENTS

| | | |
|---|---|---|
| 0321066 | 6/1989 | European Pat. Off. . |
| 1145386 | 3/1969 | United Kingdom . |
| 1433221 | 4/1976 | United Kingdom . |

Primary Examiner—Prince Willis, Jr.
Assistant Examiner—J. Silbermann
Attorney, Agent, or Firm—Luther A. R. Hall

[57] ABSTRACT

A composition for treating an aqueous system to inhibit deposition of scale caused by scale-forming impurities in the system which comprises (A) a hydrolysed homopolymer of maleic anhydride having a weight average molecular weight of 400 to 800 or a water-soluble salt thereof and (B) a carboxyl-containing acrylic polymer having a weight average molecular weight of 800 to 9500 selected from a polyacrylic acid, a polymethacrylic acid, a copolymer of at least two acrylic monomers, one of the monomers being acrylic acid of methacrylic acid, a copolymer of acrylic acid or methacrylic acid with a vinyl carboxylate or a styrene, a phosphinoacrylic acid telomer or a phosphinomethacrylic acid telomer, of a water-soluble salt of the carboxyl-containing acrylic polymer.

10 Claims, 5 Drawing Sheets

TREATMENT OF SEAWATER EVAPORATOR AQUEOUS SYSTEMS WITH SCALE-INHIBITING MIXTURE OF POLYMALEIC ANHYDRIDE AND A CARBOXYL-CONTAINING ACRYLIC POLYMER

FIELD OF THE INVENTION

The present invention relates to a composition for treating aqueous systems to inhibit deposition of scale caused by scale-forming impurities in the systems and to a method of treating aqueous systems with such a composition.

DESCRIPTION OF THE PRIOR ART

Numerous anti-scaling additives have been proposed for addition to water used, for example, in heating and cooling systems, evaporators and washing plants, to inhibit the deposition of scale from salts of metals such as calcium or magnesium present as impurities in the water. Such additives include certain polyphosphates, polyacrylic acids and their salts, polymethacrylic acids and their salts, polyacrylamides, lignin sulphonic acid and its salts, tannin, naphthalene sulphonic acid-formaldehyde condensation products, phosphonic acids and their salts, hydrolysed polymaleic anhydride and salts thereof and hydrolysed copolymers of maleic anhydride and salts thereof.

GB 1433221 describes a process for the treatment of water or an aqueous system to inhibit scale deposition which comprises adding to the water or aqueous system a combination of 20 to 85% by weight of hydrolysed polymaleic anhydride or a water-soluble salt thereof and 15 to 80% of a polyacrylic or polymethacrylic acid, or water-soluble salt thereof, having a molecular weight of 1,000 to 50,000, preferably 10,000 to 25,000.

SUMMARY OF THE INVENTION

It has now been found, surprisingly, that if a hydrolysed homopolymer of maleic anhydride, particularly such a homopolymer having a weight average molecular weight of 400 to 800, is used for water treatment in admixture with a carboxyl-containing acrylic polymer having a weight average molecular weight of 800 to 9,500, a synergistic scale inhibition effect can be obtained for mixtures ranging from those containing a high proportion of the hydrolysed maleic anhydride homopolymer to those containing a high proportion of the acrylic polymer. Such mixtures exhibit very good threshold properties and very good surface adsorption onto metal surfaces in contact with aqueous liquids containing the dissolved mixtures, for example metal surfaces in heating or cooling systems, thereby providing highly effective protection for such surfaces. Accordingly, the present invention provides a composition for treating an aqueous system to inhibit deposition of scale caused by scale-forming impurities in the system which comprises (A) a hydrolysed homopolymer of maleic anhydride having a weight average molecular weight of 400 to 800 or a water-soluble salt thereof and (B) a carboxyl-containing acrylic polymer having a weight average molecular weight of 800 to 9,500 selected from polyacrylic acids, polymerthacrylic acids, copolymers of acrylic acid or methacrylic acid with at least one other acrylic monomer, copolymers of acrylic acid or methacrylic acid with a vinyl carboxylate, or a styrene, phosphinoacrylic acid telomers or phosphinomethacrylic acid telomers, or a water-soluble salt of the carboxyl-containing acrylic polymer.

Figure 1:
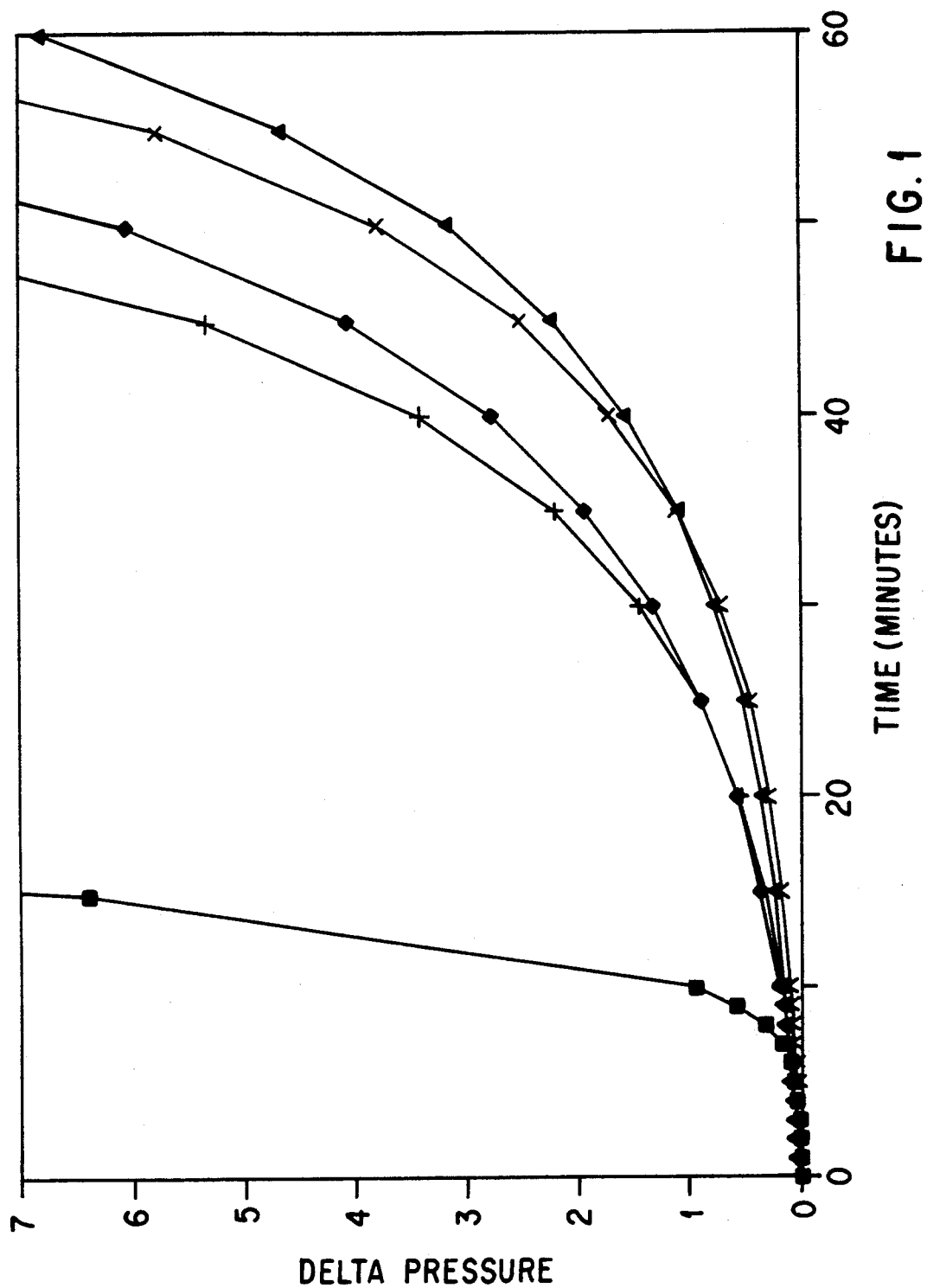
FIG. 1 through 5 are graphical illustrations of the effect of the combination of polymers (A) and (B) for the inhibition of scale as shown by the change in pressure versus time for an aqueous system.

The hydrolysed maleic anhydride homopolymer (A) may have a weight average molecular weight from 400 to 800, preferably from 500 to 700. It may be prepared by polymerisation of maleic anhydride in 'reactive' solvents such as toluene and xylene followed by hydrolysis as described, for example, in GB 1369429 and U.S. Pat. No. 3,919,258. Hydrolysis of the homopolymer may be carried out using water or dilute acid or alkali, so the hydrolysis product may be a carboxylic acid or an alkali metal salt thereof. The hydrolysis product may be used as prepared or, where it is in carboxylic acid form, it may be converted before use into a water-soluble salt, for example an alkali metal or ammonium salt.

DETAILED DESCRIPTION OF THE INVENTION

Suitable acrylic polymers (B) include polyacrylic acids and water-soluble salts thereof; polymethacrylic acids and water-soluble salts thereof; copolymers of acrylic acid or methacrylic acid with at least one other acrylic monomer, for example an alkyl or hydroxyalkyl ester of acrylic or methacrylic acid such as methyl acrylate, ethyl acrylate, isopropyl acrylate, n-butyl acrylate, 2-ethylhexyl acrylate and the corresponding methacrylates, acrylamide, methacrylamide, acrylonitrile and methacrylonitrile, copolymers of acrylic acid or methacrylic acid with a vinyl ester of a monocarboxylic acid such as vinyl acetate or vinyl propionate or with a styrene such as styrene itself, alpha-methylstyrene or p-methylstyrene; water-soluble salts of the above mentioned copolymers; phosphinoacrylic acid telomers and phosphinomethacrylic acid telomers including telomers such as those described in GB 1458235 and GB 1595688 and cotelomers of phosphinoacrylic acid or phosphinomethacrylic acid with a carboxyl- or sulphonic acid - group containing ethylenic monomer such as those described in EP 0150706 and water-soluble salts of such telomers; and mixtures of two or more of such acrylic polymers. Suitable water-soluble salts of the acrylic polymer (B) include alkali metal and ammonium salts.

Preferred acrylic polymers (B) include polyacrylic acids, which may be obtained by polymerisation of acrylic acid or by hydrolysis of polymers of esters or amides of acrylic acid, water-soluble salts of polyacrylic acids, phosphinoacrylic acid telomers as described in GB 1458235 and GB 1595688 and water-soluble salts of such telomers.

The weight average molecular weight of the acrylic polymer (B) is generally from 1,000 to 9,500, more usually from 3,000 to 6,000.

A synergistic effect can generally be obtained at most weight ratios of (A) to (B), for example weight ratios between 10:90 and 90:10. Preferably the weight ratio of hydrolysed homopolymer (A) to acrylic polymer (B) is from 25:75 to 75:25. Within those limits the optimum ratio may vary according to the nature of the acrylic polymer (B) and the amount of the composition added to an aqueous system. For instance, ratios of 25:75, 50:50 and 75:25 can be used successfully.

The invention also provides a process for the treatment of an aqueous system which comprises adding to the system a composition as hereinbefore described. The amount of composition added to the aqueous system to inhibit deposition of scale may be from 0.1 to 100 ppm, preferably from 0.5 to 20 ppm, by weight.

The compositions of the invention are particularly effective in inhibiting a deposition of scale-forming salts derived from calcium, magnesium, barium or strontium cations, and anions such as sulphate, carbonate, hydroxide, phosphate and silicate anions.

Aqueous systems treated in accordance with the invention may be wholly or partly of water. Of particular interest are cooling water systems, steam generating systems, sea-water evaporators, reverse osmosis equipment, bottle washing plants, pulp and paper manufacturing equipment, sugar evaporator equipment, soil irrigation systems hydrostatic cookers, gas scrubbing systems, flue gas desulphurisation systems, closed circuit heating systems, aqueous-based refrigeration systems, oil production and drilling systems, oil refineries, waste treatment plants, crystallisers, metal recovery systems and photographic developing baths.

The compositions of the invention may be used alone, or in conjunction with other materials known to be useful in the treatment of aqueous systems. In the treatment of systems such as cooling water systems, air-conditioning systems, steam-generating systems, sea-water evaporator systems, hydrostatic cookers, and closed circuit heating or refrigerant systems, corrosion inhibitors may be used such as, for example, water soluble zinc salts; phosphates; polyphosphates; phosphonic acids and their salts, for example, hydroxyethyl diphosphonic acid (HEDP), nitrilotris methylene phosphonic acid and methylamino dimethylene phosphonocarboxylic acids and their salts, for example, those described in German Offenlegungsschrift 2632774, hydroxyphosphonoacetic acid, 2-phosphonobutane-1,2,4-tri-carboxylic acid and those disclosed in GB 1572406; nitrates, for example, sodium nitrate; nitrites, e.g. sodium nitrite; molybdates, e.g. sodium molybdate; tungstates; silicates, e.g. sodium silicate; benzotriazole, bis-benzotriazole or copper deactivating benzotriazole or tolutriazole derivatives or their Mannich base derivatives; mercaptobenzotriazole; N-acyl sarcosines; N-acylimino diacetic acids; ethanolamines; fatty amines; and polycarboxylic acids, for example, copolymers of maleic anhydride with, for example, ethyl acrylate, vinyl acetate or sulfonated styrene, Moreover, in such systems, the composition used according to the invention may be used in conjunction with further dispersing and/or threshold agents, e.g. hydrolysed polyacrylonitrile, lignin sulphonic acid and its salts, tannin, naphthalene sulphonic acid/formaldehyde condensation products, starch and its derivatives, cellulose, styrene/maleic anhydride copolymers and sulfonated styrene homopolymers, e.g. those described in U.S. Pat. No. 4,374,733 and combinations thereof. Specific threshold agents such as, for example, 2-phosphono-butane-1,2,4-tri-carboxylic acid (PBSAM), hydroxyethyl diphosphonic acid (HEDP), alkyl phosphonic acids, hydroxyphosphonoacetic acid, 1-aminoalkyl-1,1-diphosphonic acids and their salts, and alkali metal polyphosphates, may also be used.

Particularly interesting additive packages are those comprising compositions of the invention with one or more of maleic acid copolymers, especially terpolymers with ethyl acrylate and vinyl acetate, or substituted copolymers, hydroxyphosphonoacetic acid, HEDP, PBSAM, triazoles such as tolutriazole, molybdates and nitrites.

Other materials which may be used together with compositions of the invention include precipitating agents such as alkali metal orthophosphates and carbonates; oxygen scavengers such as alkali metal sulphites and hydrazines; sequestering agents such as nitrilotriacetic acid and its salts; antifoaming agents such as silicones, e.g. polydimethylsiloxanes, distearlysebacamide, distearyl adipamide and related products derived from ethylene oxide and/or propylene oxide condensations, in addition to fatty alcohols, such as capryl alcohols and their ethylene oxide condensates; and biocides, e.g. amines, quaternary ammonium compounds, chlorophenols, sulphur-containing compounds such as sulphones, methylene bis thiocyanates and carbamates, isothiazolones, brominated propionamide, triazines, phosphonium compounds, chlorine and chlorine-release agents bromine, and bromine-release agents, and organometallic compounds such as tributyl tin oxide.

The invention is illustrated by the following Examples. Molecular weights given in the Examples are weight average molecular weights.

EXAMPLE 4

A tube blocking test is used to compare the scale control performance at 1 ppm addition of a hydrolysed maleic anhydride homopolymer having a molecular weight of 580, a polyacrylic acid having a molecular weight of 4,510 and a composition containing both polymers, under aqueous conditions. The inhibitor under test is mixed with a synthetic seawater which is prepared from the following two solutions:

SOLUTION 1

40 g/liter NaCl
3.08 g/liter $CaCl_2 2H_2O$
22,2 g/liter $MgCl_2 6H_2O$
1.6 g/liter KCl
8.25 g/liter $Na_2SO_4$

SOLUTION 2

3.06 g/liter NaCl
0.69 g/liter $Na_2CO_3$

The resulting solution is pumped through a cupro-nickel coil, 1 meter in length and 1.1 mm internal diameter, which is immersed in a water bath at 90° C. The deposition of scale inside the tube results in an increase in the velocity of the fluid and an increase in pressure. The change in pressure across the tube is monitored using a ceramic pressure sensor inside a pressure measurement and control unit. The resulting change in pressure is shown in FIG. 1, where the plot with points marked with squares shows the change for the maleic anhydride homopolymer (A), the plot with points marked with +shows the change for the polyacrylic acid (B), the plot marked with diamonds shows the change for and A:B weight ration of 25:75, the plot marked with triangles shows the change for an A:B weight ratio of 50:50 and the plot marked with X shows the change for an A:B weight ratio of 75:25. The synergistic effect obtained with compositions of the invention is evident from these plots.

EXAMPLE 2

Figure 2:
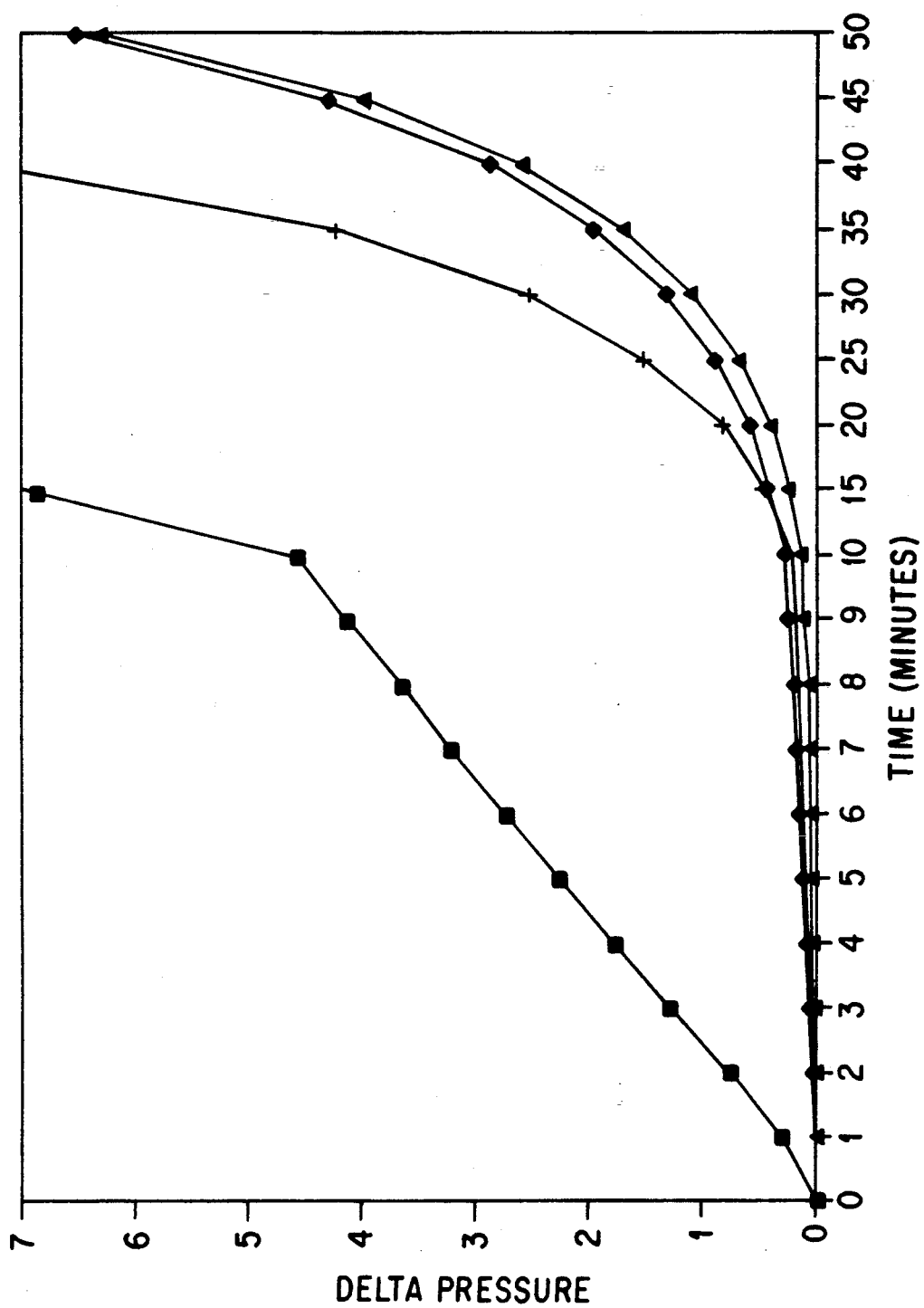

The test procedure of Example 1 is repeated, but using a different cupro-nickel coil of nominally the same dimensions, to compare the scale control performance, at 1 ppm addition, of the maleic anhydride homopolymer used in Example 1, a sodium salt of a polyacrylic acid of molecular weight 9370 and compositions of the invention containing mixtures of both polymers. The results are shown in FIG. 2, where the plot with points marked with the square symbol shows the change (delta pressure) for the maleic anhydride homopolymer (A), the plot with points marked + shows the change for the polyacrylic acid (B), the plot with points marked with diamonds shows the change for an A:B weight ratio of 25:75, and the plot marked with triangles shows the change for an A:B weight ratio of 50:50. The synergistic effect obtained with compositions of the invention is evident from these plots. The use of a different coil gives values for the maleic anhydride homopolymer different from those of Example 1. The scale of the plot in FIG. 2 is different from that of FIG. 1.

EXAMPLE 3

Figure 3:
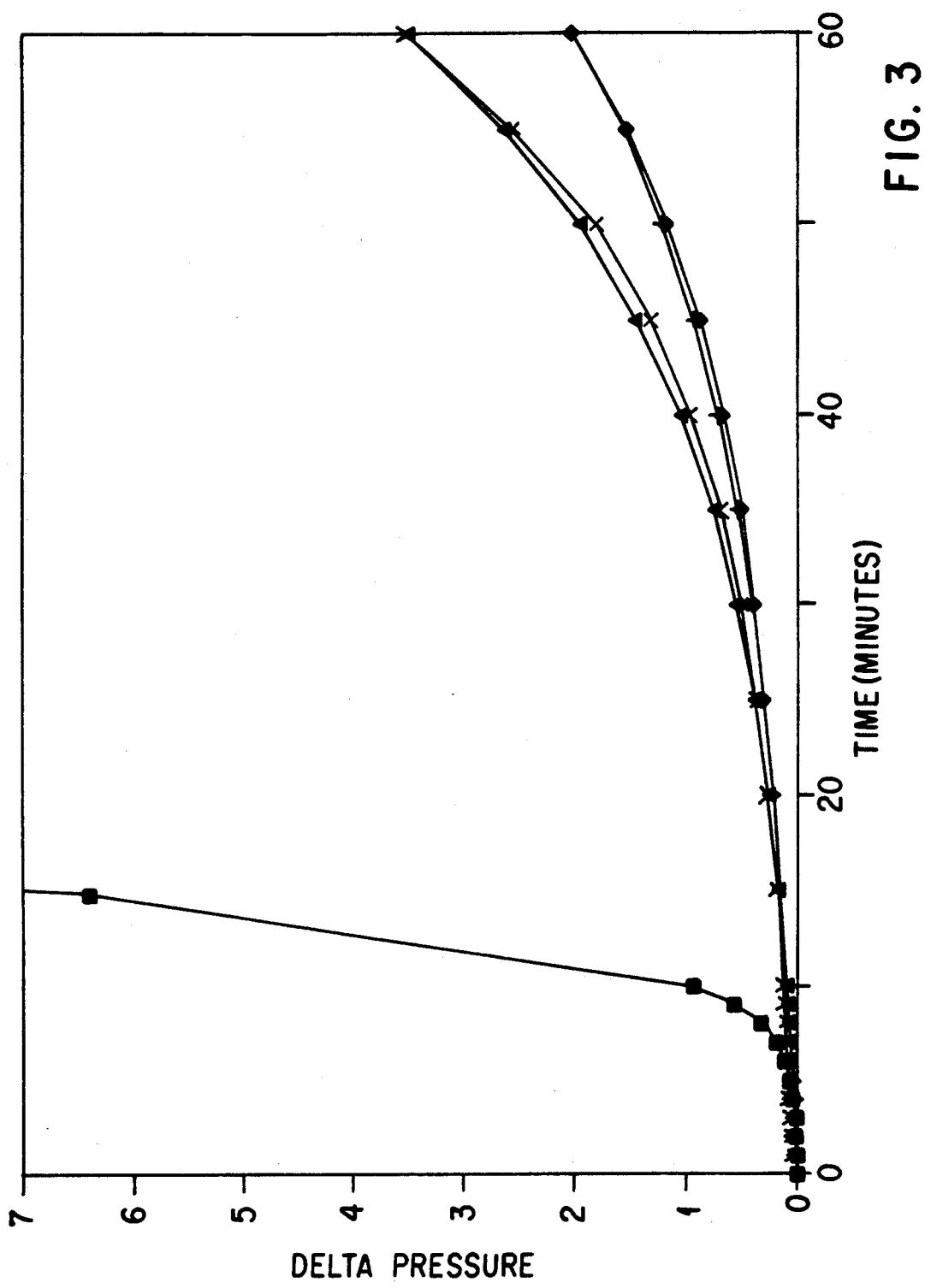

The test procedure of Example 1 is repeated to compare the scale control performance, at 1 ppm addition, of the maleic anhydride homopolymer used in Example 1, a polyacrylic acid of molecular weight 1890 and compositions of the invention containing mixtures of both polymers. The results are shown in FIG. 3, where the plot with points marked with the square symbol shows the change (delta pressure) for the maleic anhydride homopolymer (A), the plot with points marked +- shows the change for the polyacrylic acid (B), the plot with points marked with diamonds shows the change for an A:B weight ratio of 25:75, the plot marked with triangles shows the change for an A:B weight ratio of 50:50 and the plot marked with x shows the change for an A:B weight ratio of 75:25. The synergistic effect obtained is evident from these plots.

EXAMPLE 4

Figure 4:
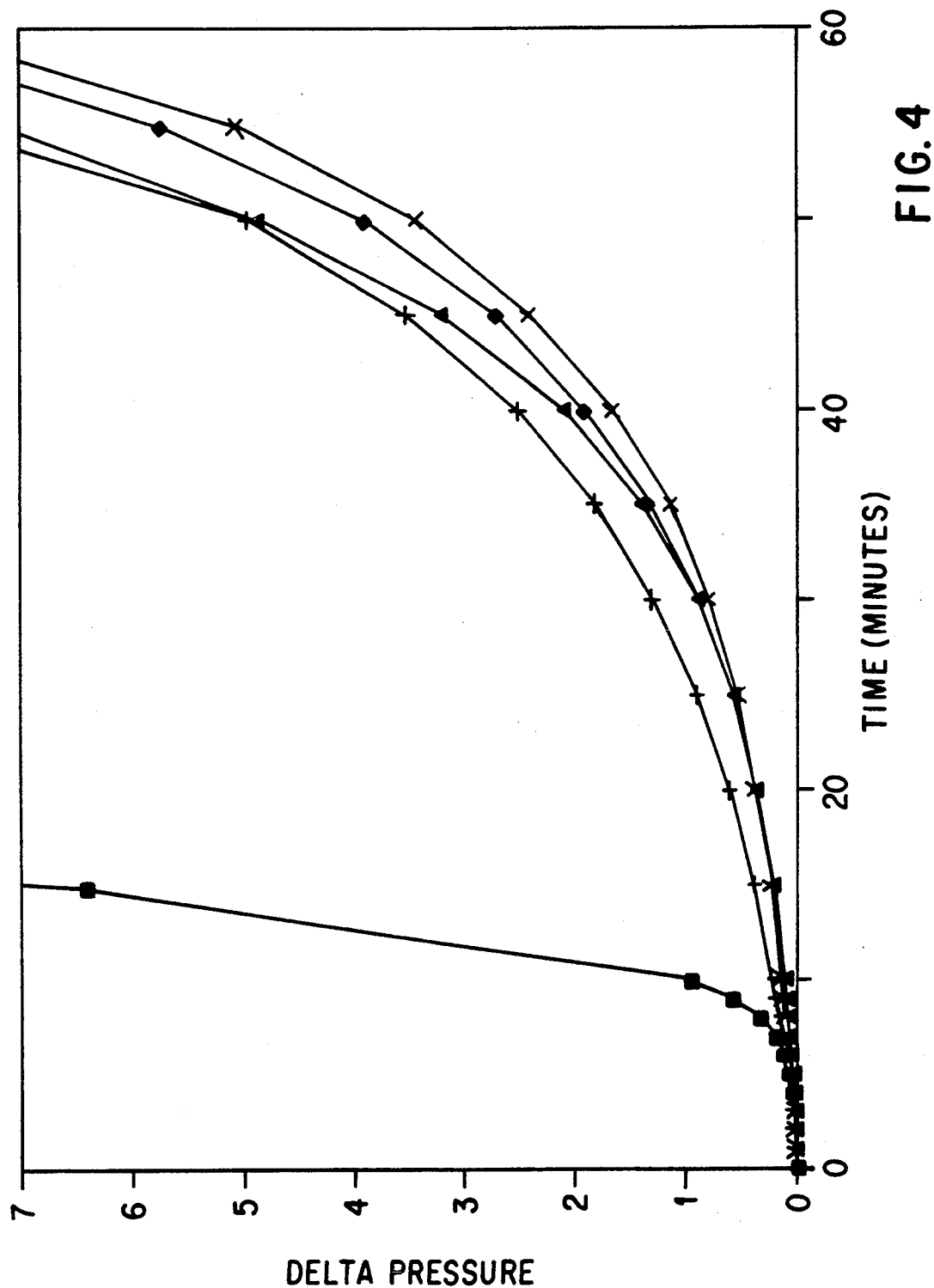

The test procedure of Example 1 is repeated to compare the scale control performance, at 1 ppm addition, of the maleic anhydride homopolymer (A) used in Example 1, a phosphinoacrylic acid telomer (B) having a molecular weight of 3500 and compositions of the invention containing mixtures of the homopolymer (A) and the telomer (B). The results are shown in FIG. 4, where the plot marked with squares shows the change (delta pressure) for the homopolymer (A), the plot marked with + shows the change for the telomer (B), the plot marked with diamonds shows the change for an A:B weight ratio of 25:75, the plot marked with triangles show the change for an A:B weight ratio of 50:50 and the plot marked with X shows the change for an A:B weight ratio of 75:25. The synergistic effect obtained is evident from these plots.

EXAMPLE 5

Figure 5:
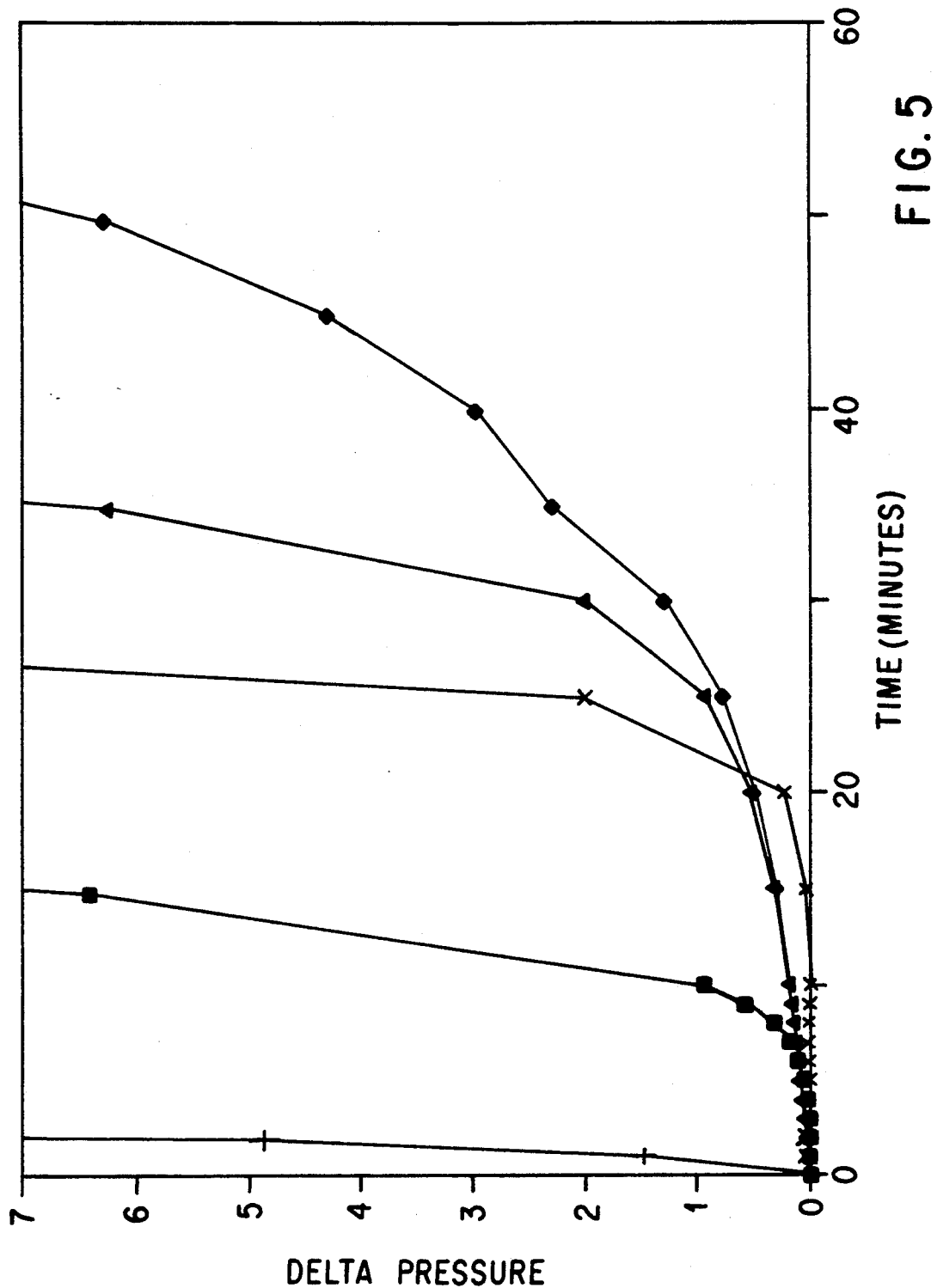

The test procedure of Example 1 is repeated to compare the scale control performance, at 1 ppm addition, of the maleic anhydride homopolymer (A) used in Example 1, a phosphinoacrylic acid telomer (B) having a molecular weight of 1000 and compositions of the invention containing mixtures of the homopolymer (A) and the telomer (B). The results are shown in FIG. 5, where the plot marked with + shows the change for the telomer (B), the plot marked with diamonds shows the change for an A:B weight ratio of 25:75, the plot marked with triangles shows the change for an A:B weight ratio of 50:50 and the plot marked with X shows the change for an A:B weight ratio of 75:25. The synergistic effect obtained is evident from these plots.

What is claimed is:

1. A process for the treatment of a seawater evaporator aqueous system, to inhibit deposition of scale caused by scale-forming impurities present in the system, which comprises adding to the system from 0.5 to 20 ppm by weight of a composition comprising
   (A) a hydrolyzed homopolymer of maleic anhydride having a weight average molecular weight of 400 to 800 or a water soluble salt thereof, and
   (B) a carboxyl-containing acrylic polymer having a weight average molecular weight of 800 to 9,500 selected from a copolymer of at least two acrylic monomers one of said monomers being acrylic acid or methacrylic acid, a copolymer of acrylic acid or methacrylic acid with a vinyl carboxylate or a styrene, a phosphinoacrylic acid telomer or a phosphinomethacrylic acid telomer or a water soluble salt of the carboxyl-containing acrylic polymer, the weight ratio of (A) to (B) being from 25:75 to 75:25.

2. A process for the treatment of a seawater evaporator aqueous system, to inhibit deposition of scale caused by scale-forming impurities present in the system, which comprises adding to the system from 0.5 to 20 ppm by weight of a composition comprising
   (A) a hydrolyzed homopolymer of maleic anhydride having a weight average molecular weight of 400 to 800 or a water soluble salt thereof, and
   (B) a carboxyl-containing acrylic polymer having a weight average molecular weight of 800 to 9,500 selected from a polyacrylic acid, a polymethacrylic acid or a water soluble salt thereof, 3. A process according to claim 1, in which the hydrolysed homopolymer (A) has a weight average molecular weight of 500 to 700.

4. A process according to claim 1, in which the acrylic polymer (B) is a phosphinoacrylic acid telomer or a water-soluble salt of the telomer.

5. A process according to claim 1, in which the molecular weight of the acrylic polymer (B) is from 1,000 to 9,500.

6. A process according to claim 12, in which the molecular weight of the acrylic polymer (B) is from 3,000 to 6,000.

7. A process according to claim 1, in which the aqueous system contains cations selected from calcium, magnesium, barium or strontium cations and anions selected from sulphate, carbonate, hydroxide, phosphate or silicate anions.

8. A process according to claim 2 in which the acrylic polymer (B) is a polyacrylic acid or a water soluble salt thereof.

9. A process according to claim 2 in which the molecular weight of the acrylic polymer (B) is from 1,000 to 9,500.

10. A process according to claim 9 in which the molecular weight of the acrylic polymer (B) is from 3,000 to 6,000.

* * * * *

UNITED STATES PATENT AND TRADEMARK OFFICE
CERTIFICATE OF CORRECTION

PATENT NO. : 5,152,403

DATED : October 6, 1992

INVENTOR(S) : Suresh Patel

It is certified that error appears in the above-identified patent and that said Letters Patent is hereby corrected as shown below:

Column 4, line 25, "Example 4" should read --Example 1--. Column 4, line 38, "22,2g/liter" should read --22.2g/liter--.

Signed and Sealed this

Second Day of November, 1993

*Attest:*

BRUCE LEHMAN

*Attesting Officer*  *Commissioner of Patents and Trademarks*